United States Patent

Ohshima et al.

[11] Patent Number: 5,482,601
[45] Date of Patent: Jan. 9, 1996

[54] METHOD AND DEVICE FOR THE PRODUCTION OF CARBON NANOTUBES

[75] Inventors: Satoshi Ohshima, Abiko; Motoo Yumura, Isukuba; Yasunori Kuriki, Tsukuba; Kunio Uchida, Tsukuba; Fumikazu Ikazaki, Tsukuba, all of Japan

[73] Assignee: Director-General of Agency of Industrial Science and Technology, Japan

[21] Appl. No.: 372,130

[22] Filed: Jan. 13, 1995

[30] Foreign Application Priority Data

Jan. 28, 1994 [JP] Japan .................................. 6-026039

[51] Int. Cl.⁶ .................................................. C01B 31/00
[52] U.S. Cl. ........................................ 204/173; 422/186.26
[58] Field of Search ........................ 204/173; 422/186.26

[56] References Cited

U.S. PATENT DOCUMENTS 5,227,038  7/1993  Smalley et al. ........................ 204/173
5,424,054  6/1995  Bethune et al. ........................ 423/447.2

FOREIGN PATENT DOCUMENTS 157016  6/1994  Japan .
280116  10/1994  Japan .

OTHER PUBLICATIONS

Nature, vol. 358, No. 6383, 16 Jul. 1992, pp. 220–222.
Patent Abstracts of Japan vo. 18, No. 482/JPA–06–157016.

Primary Examiner—John Niebling
Assistant Examiner—Kishor Mayekar
Attorney, Agent, or Firm—Lorusso & Loud

[57] ABSTRACT

Carbon nanotubes are produced by successively repositioning an axially extending rod-like carbonaceous anode relative to a cathode surface such that a tip end surface of the anode successively faces on different portions of the cathode surface while impressing a direct current voltage therebetween, so that an arc discharge occur with the simultaneous formation of carbonaceous deposits containing carbon nanotubes on each of the portions of the cathode surface. The carbonaceous deposits are scraped and collected. A device for carrying out the above method includes a driving member for displacing the cathode surface relative to the anode.

6 Claims, 2 Drawing Sheets

METHOD AND DEVICE FOR THE PRODUCTION OF CARBON NANOTUBES

BACKGROUND OF THE INVENTION

This invention relates to a method of producing carbon nanotubes and to a device therefor, Carbon nanotubes are recently discovered, hollow graphite tubules having a diameter of generally several to several tens nanometers. One method for the preparation of carbon nanotubes is disclosed in Nature, 358, 220 (1992) by Ebbesen et al. In this method, a DC potential of about 18 V is applied between a 6 mm diameter graphite rod (anode) and a 9 mm diameter graphite rod (cathode) which are coaxially disposed in a reaction vessel maintained in an inert gas atmosphere. By positioning the two rods close to each other, an arc discharge occurs with the simultaneous deposition of a carbonaceous material containing carbon nanotubes on the cathode rod. Since the anode rod is consumed as the arc discharge proceeds, the anode (or cathode) is occasionally displaced to maintain a constant gap.

The known method has a problem because it is not possible to continuously produce carbon nanotubes in a large amount. Further, since carbonaceous deposits are gradually accumulated on the cathode, it is difficult to maintain the optimum gap between the anode and the cathode and, thus, to maintain the optimum conditions for the production of carbon nanotubes.

SUMMARY OF THE INVENTION

It is, therefore, an object of the present invention to provide a method which can continuously produce carbon nanotubes in a large amount.

Another object of the present invention is to provide a method of the above-mentioned type which allows easy adjustment of the gap between an anode and a cathode.

It is a further object of the present invention to provide a device useful for carrying out the above method.

In accomplishing the foregoing objects, the present invention provides a method of producing carbon nanotubes, comprising the steps of:

(a) successively positioning an axially extending rod-like carbonaceous anode having a tip end surface and a cathode having a cathode surface having an area greater than that of said tip end surface in an atmosphere of an inert gas such that said tip end surface successively faces on different portions of said cathode surface while keeping the distance therebetween substantially unchanged and while keeping the axis of said rod-like anode oriented in the direction normal to each of said portions of said cathode surface;

(b) impressing a direct current voltage between said anode and said cathode to cause an arc discharge to occur between said tip end surface of said anode and each of said portions of said cathode surface and to permit carbonaceous deposits containing carbon nanotubes to accumulate on each of said portions; and (c) scraping said carbonaceous deposits from each of said portions.

In another aspect, the present invention provides a device for producing carbon nanotubes, comprising:

an airtight chamber;

an axially extending rod-like carbonaceous anode having a tip end surface;

a cathode having a cathode surface having an area larger than that of said tip end surface of said anode;

means for feeding an inert gas to said chamber;

means for supporting said cathode such that said cathode surface thereof is positioned within said chamber;

means for supporting said anode such that said tip end surface is positioned within said chamber and faces on said cathode surface with the axis of said rod-like anode being oriented in the direction normal to said cathode surface;

first means for controlling the distance between said tip end surface and said cathode surface;

second means for successively positioning said anode and said cathode such that said tip end surface successively faces on different portions of said cathode surface;

means for impressing a direct current voltage between said anode and said cathode so as to cause an arc discharge to occur between said tip end surface of said anode and each of said portions of said cathode surface and to permit carbonaceous deposits containing carbon nanotubes to accumulate on each of said portions of said cathode surface; and means for scraping the carbonaceous deposits from each of said portions of said cathode surface.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
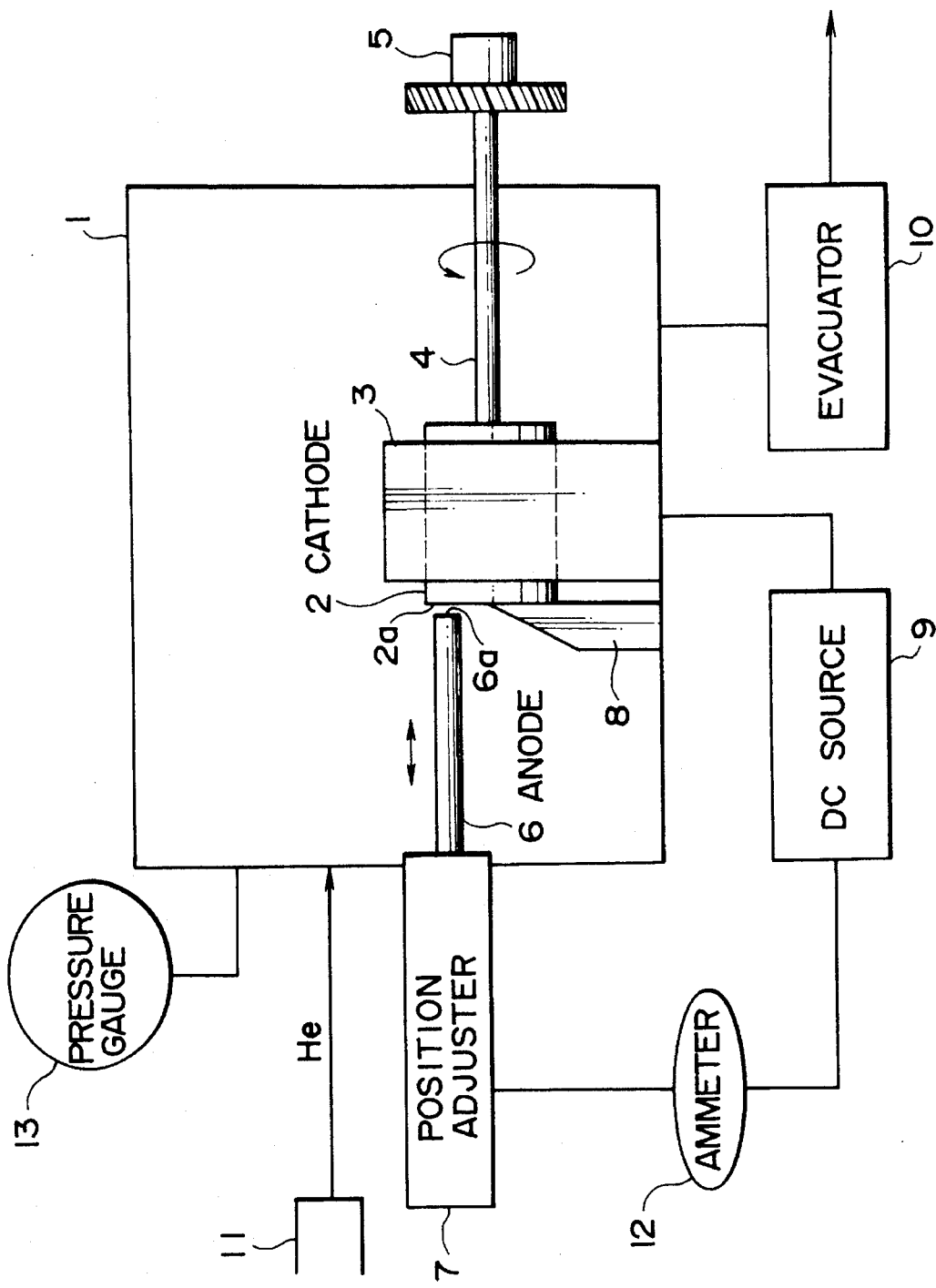
FIG. 1 is a schematic illustration of a device for the production of carbon nanotubes according to the present invention.
Figure 2:
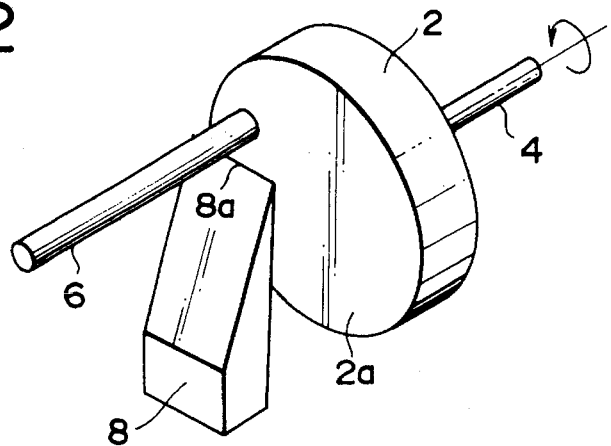
FIG. 2 is a schematic illustration of the arrangement of an anode, a cathode and a blade in the device of FIG. 1.

Referring to FIGS. 1 and 2, designated as 1 is an airtight chamber in which an arc discharge is to be carried out. An axially extending rod-like anode 6 having a tip end surface 6a is horizontally disposed within the chamber 1. The anode 6 is formed of a carbonaceous material such as carbon, graphite or metal-containing graphite. The metal of the metal-containing graphite may be, for example, copper, iron or cobalt. The diameter of the anode 6 is generally 5–30 mm, preferably 8–15 mm. The anode 6 is supported by a holder (not shown) which in turn is connected to a position adjuster 7. The position adjuster 7 is operated manually or automatically to axially displace the anode 6 so as to position the tip end surface 6a thereof at a desired location. The holder is electrically connected to a positive pole of a direct current source 9 through an ammeter 12.

A cathode 2 having a cathode surface 2a is also disposed within the chamber 1 such that the cathode surface 2a is oriented normal to the axis of the rod-like anode 6. It is important that the area of the cathode surface 2a is larger than that of the tip end surface 6a of the anode 6. Preferably, the cathode surface 2a is at least 4 times as large as the tip end surface 6a. The cathode 2, which is formed of a heat-resisting conductive material such as a metal, e.g. copper, or a carbonaceous material such as carbon, graphite or metal-containing graphite, is in the form of a cylinder whose axis is oriented in parallel with the axis of the anode 6 but is departed from the axis of anode 6.

Designated as 3 is a support member fixed within the chamber 1 and having a hole in which the cylindrical cathode 2 is rotatably received such that the axis of the cathode 2 serves as the center of rotation thereof. The support member 3 is made of a conductive member and is electrically contacted with the cathode 2. The support member 3 is coupled to a negative pole of the direct current source 9.

The cylindrical cathode 2 has an end surface which is opposite to the cathode surface 2a and to which a coaxial, electrically insulating shaft 4 is secured for rotation with the cathode 2. The shaft 4 extends out of the chamber 1 and is connected to a driving mechanism 5 including an electric motor for rotating the shaft 4.

As a result of the above construction, by mounting the rod-like anode 6 on the holder, the tip end surface 6a faces in the direction of the cathode surface 2a of the cathode 2. By operating the position adjuster 7, the gap between the tip end surface 6a and the cathode surface 2a is adjustable at will. By operating the driving mechanism 5, the cathode 2 is rotated so that the anode surface 6a can face on different portions of the cathode surface 2a.

Designated as 11 is a source of an inert gas such as helium, argon or nitrogen for feeding the inert gas of a controlled pressure to the chamber 1. A pressure gauge 13 is connected to the chamber 1 for measuring the inside pressure of the chamber 1. Designated as 10 is an evacuator.

A scraping member 8 is disposed within the chamber for scraping carbonaceous deposits formed on the surface of the cathode surface 2a. The scraping member 8 in the illustrated embodiment includes a blade whose edge 8a is maintained in contact with the cathode surface 2a.

Figure 3:
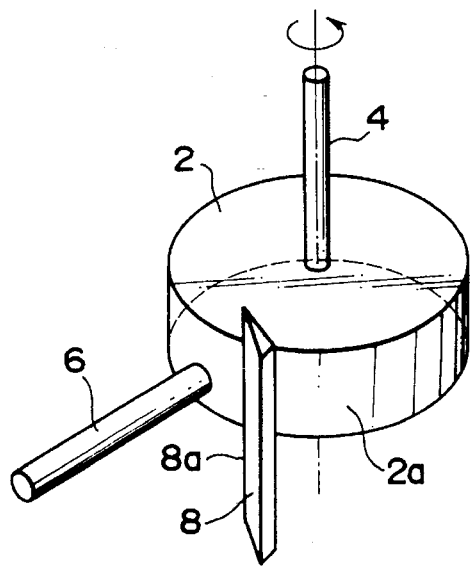
FIGS. 3 and 4 are schematic illustrations, similar to FIG. 2, showing other arrangements.
Figure 4:
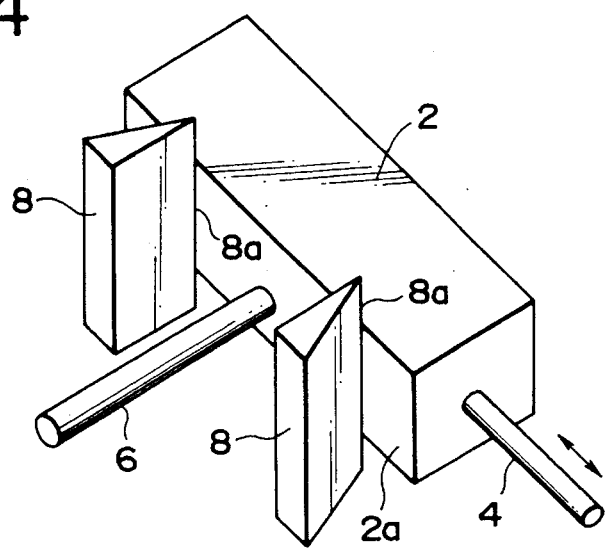

The structure of the cathode may be changed in various manners. In the embodiment shown in FIG. 3, the peripheral surface of the cylindrical cathode 2 provides the cathode surface 2a. The rotational axis of the cathode 2 is oriented normal to that of the anode 6. By rotation of the cathode 2, the tip end surface 6a of the anode successively faces on different portions of the cathode surface 2a. In an alternative embodiment shown in FIG. 4, the cathode 2 is reciprocally displaced in the direction normal to the axis of the anode 6 and the cathode surface 2a extends in the direction parallel with the reciprocating direction. If desired, the displacement of the tip end surface 6a of the anode 6 relative to the cathode surface 2a in the foregoing embodiments may be performed manually.

While, in the foregoing embodiments, the cathode 2 is movably constructed, it is possible to stationarily fix the cathode 2 within the chamber 1 with the anode 6 being arranged to be moved not only in the axial direction but also in parallel with the cathode surface 2a. However, since it is also necessary to move the scraping member 8 and parts associated with the anode 6, the structure becomes more complicated as compared with the foregoing embodiments.

A method of producing carbon nanotubes according to the present invention using the device of FIG. 1 will be now described.

In starting up, the anode 6 is displaced to bring the tip end surface 6a into contact with the cathode surface 2a. The evacuator 10 is operated to reduce the pressure within the chamber 1 to 0.1–760 Torr, preferably 1–20 Torr and, then, the direct current voltage source 10 is connected to the anode 6 and the cathode 2 to heat them while continuing the evacuation. By this pretreatment, oxygen and moisture entrapped in respective parts within the chamber are withdrawn therefrom.

Helium gas is then fed from the source 11 to the chamber 1 and the helium gas pressure is maintained at 10 Torr to 2 atm, preferably at 500 Torr to 1 atm. Thereafter, the position adjuster 7 is operated to adjust the distance between the tip end surface 6a and the anode surface 2a to generally 0.1–5 mm, preferably 0.5–2 mm, while impressing the direct current voltage of generally 15–35 V, preferably 18–21 V therebetween, so that an arc discharge occurs with the simultaneous deposition of a carbonaceous material containing carbon nanotubes on that portion of the cathode surface 2a which is adjacent to the tip end surface 6a of the anode 6. The DC current in this case is controlled to 100–200 A.

While continuing the arc discharge, the driving mechanism 5 is continuously or intermittently operated to rotate the cathode 2 and to change the relative position between the tip end surface 6a and the cathode surface 2a. The rotational speed may be such that the average running speed of the tip end surface 6a relative to the cathode surface 2a ranges from 60 to 300 mm/minute. During the rotation of the cathode 2, the carbonaceous deposits are scraped by the blade 8 and collected. The distance between the cathode surface 2a and the tip end surface 6a is also controlled in the above range since the anode is consumed as the arc discharge proceeds.

The following example will further illustrate the present invention.

EXAMPLE

Carbon nanotubes were produced using the device shown in FIG. 1. A graphite rod having a diameter of 15 mm was used as the anode 6 while a cylindrical graphite rod having a diameter of 65 mm was used as the cathode 2. The anode 6 and the cathode 2 were disposed within the chamber so that the axis of the anode 6 was spaced apart by a distance of 25 mm from the axis of the cathode 2. After locating the anode 6 in abutting engagement with the cathode 2, the chamber 1 was evacuated. While maintaining the chamber 1 at a pressure of about 1 Torr, a DC current was allowed to flow through the anode 6 and cathode 2 for 3 hours to heat the anode 6 and cathode 2. Then, helium gas was continuously fed to the chamber 1 at a rate of 10 liters per minute under a pressure of 1 atm. The anode 6 was slightly retracted to form a gap of 1 mm between the tip end surface 6a and the cathode surface 2a, so that arc discharge occurred. While maintaining the electrical current at 100 A and the gap between the anode and the cathode at 1 mm, the cathode 2 was rotated at a rate of about 10 revolutions per minute. Thus, the carbonaceous material deposits formed on the cathode surface 2a were continuously scraped with the blade 8 and collected in the bottom of the chamber 1. The yield of the carbonaceous material was about 1 g per hour. The SEM photograph revealed that carbon nanotubes were contained in the carbonaceous material.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of producing carbon nanotubes, comprising the steps of:

(a) successively positioning an axially extending carbonaceous anode rod having a tip end surface and a cathode having a cathode surface having an area greater than that of said tip end surface in an atmosphere of an inert gas such that said tip end surface successively faces on different portions of said cathode surface while keeping a distance therebetween substantially unchanged and while keeping the axis of said anode rod oriented in the direction normal to each of said portions of said cathode surface;

(b) impressing a direct current voltage between said anode and said cathode to cause an arc discharge to occur between said tip end surface of said anode rod and each of said portions of said cathode surface and to permit carbonaceous deposits containing carbon nanotubes to accumulate on each of said portions; and (c) scraping said carbonaceous deposits from each of said portions.

2. A method as claimed in claim 1, wherein step (a) is performed continuously.

3. A method as claimed in claim 2, wherein step (a) is performed intermittently.

4. A device for producing carbon nanotubes, comprising:

an airtight chamber;

an axially extending carbonaceous anode rod having a tip end surface;

a cathode having a cathode surface having an area larger than that of said tip end surface of said anode rod;

means for feeding an inert gas to said chamber;

means for supporting said cathode such that said cathode surface thereof is positioned within said chamber;

means for supporting said anode rod such that said tip end surface is positioned within said chamber and faces said cathode surface with the axis of said anode rods being oriented in the direction normal to said cathode surface;

first means for controlling the distance between said tip end surface and said cathode surface;

second means for successively positioning said anode rod and said cathode such that said tip end surface successively faces on different portions of said cathode surface;

means for impressing a direct current voltage between said anode rod and said cathode so as to cause an arc discharge to occur between said tip end surface of said anode rod and each of said portions of said cathode surface and to permit carbonaceous deposits containing carbon nanotubes to accumulate on each of said portions of said cathode surface; and means for scraping the carbonaceous deposits from each of said portions of said cathode surface.

5. A device as claimed in claim 4, wherein said cathode includes an electrically conductive columnar body having a circular cross-section, said columnar body having one end providing said cathode surface and the other end fixedly connected to a coaxially extending, electrically insulating shaft, wherein said means for supporting said cathode includes a support member fixed within said chamber and having a hole in which said columnar body of said cathode is rotatably received such that the axis of said columnar body serves as the center of rotation of said columnar body, wherein said second means includes drive means connected to said shaft for rotating said shaft about the axis thereof, wherein said means for supporting said anode rod includes a holder holding said anode rod such that the axis of said anode rod is oriented in parallel with the axis of said columnar body but is departed from the axis of said columnar body, wherein said first means includes drive means connected to said holder for shifting said holder in the direction parallel with the axis of said anode rod, and wherein said scraping means includes a blade fixedly disposed within said chamber such that said blade is in sliding contact with each of said portions of said cathode surface upon rotation of said columnar body.

6. A device as claimed in claim 5, wherein said support member is formed of an electrically conductive material and is maintained in electrical contact with said columnar body, wherein said holder is formed of an electrically conductive material and is maintained in electrical contact with said anode rod, and wherein said means for impressing a direct current voltage includes lead wires extending between a DC source and said holder and between said DC source and said support member.

* * * * *

UNITED STATES PATENT AND TRADEMARK OFFICE
CERTIFICATE OF CORRECTION

PATENT NO.   : 5,482,601
DATED        : January 9, 1996
INVENTOR(S)  : OHSHIMA et al It is certified that error appears in the above-indentified patent and that said Letters Patent is hereby corrected as shown below:

On the title page, under heading "[75] Inventors:" line 2, "Isukuba" should read --Tsukuba--.

Col. 1, line 11, "358" should read --358--.

Col. 5, line 42, "rods" should read --rod--; and

Signed and Sealed this

Twenty-second Day of October, 1996

BRUCE LEHMAN

*Attest:*

*Attesting Officer*    Commissioner of Patents and Trademarks